United States Patent [19]
Chapman

[11] Patent Number: 5,762,732
[45] Date of Patent: Jun. 9, 1998

[54] TIRE INFLATION AID

[76] Inventor: John Chapman, 126 Raglan Rd., North Perth, Australia, 6006

[21] Appl. No.: 603,467

[22] Filed: Feb. 20, 1996

[51] Int. Cl.[6] .................................................. B60C 23/00
[52] U.S. Cl. .................................................. 152/415
[58] Field of Search .............................. 152/415; 137/223

[56] References Cited

U.S. PATENT DOCUMENTS

| | | | |
|---|---|---|---|
| 1,555,049 | 9/1925 | Williams | 152/415 |
| 2,158,576 | 5/1939 | Glassley | 152/415 |
| 2,211,063 | 8/1940 | Kowalkiewicz | 152/415 |
| 4,807,658 | 2/1989 | Patti | 152/415 X |
| 5,121,780 | 6/1992 | Goodman | 152/415 |

*Primary Examiner*—Francis J. Lorin

[57] ABSTRACT

The valve of a spare tire (1) has a 1 meter flexible extension to allow easier inflation. The extension comprises a flexible tube (4) having an air-supply adaptor (6) at one end and a tire valve connector (5) at the other end. A cord is inserted within the tube which maintains an open passage for air when the tube is kinked at a bend or is squeezed from load. A finger plate allows comfortable support of the air-supply adaptor when it is pressed against an air-supply nozzle.

9 Claims, 3 Drawing Sheets

TIRE INFLATION AID

TECHNICAL FIELD

This invention relates to automotive accessories and in particular accessories to aid in the delivery of air to spare tires stowed in motor vehicles.

BACKGROUND ART

Spare tires are a vital component of a motor vehicle's safety inventory, to be used as a replacement in the event of a puncture in one of the main tires. Generally the spare tire is located in or under the floor of the trunk or boot. In these instances the tire is not readily accessible especially if the trunk has contents, for example when shopping or embarking on a motoring holiday. Because of the tire's inaccessible nature, the air within the tire is commonly neglected and slow deflation can occur over a period of months. The result is that when the spare is eventually needed, its air pressure is insufficient for safe driving.

To provide access to the valve on the spare tire, suggestions (see for example patent applications AU-A 73 629/81, AU-A 77469/87 or DE2340331-A) have been for the provision of a tube which is secured to the valve and includes a tire valve at its free end. This tubing is arranged so that the free end is readily accessible either by mounting through an external body panel or by locating immediately within the trunk. The tubing serves effectively as an extension of the tire valve.

However, the valve of the spare tire is often in very close proximity to a surface such as a car body panel or floor panel. This confined space requires an air path that must be able to redirect in an elbow fashion from the axis of the valve. Curved rigid tubes, for example made from metal, have been proposed, however such constructions are expensive 25 and the radius of curvatures achievable are generally too large for the space available. Plastic tubing suffers because a kink will form which constricts the passage totally preventing the passage of air there-through. It is for these reasons that the inventions hitherto proposed have been ineffectual and have failed to attract commercial production.

SUMMARY OF THE INVENTION

The object of this invention is to provide a means of supplying air to a spare tire via an extension hose which is able to negotiate sharp corners and to withstand crushing or pinching.

The invention is said to reside in a spare tire inflation accessory comprising a flexible tube fastened at one end to a tire valve connector and at the other end to an air supply adaptor, the tire valve connector is configured to secure by a screwing action to a tire valve so as to depress the valve core allowing free transfer of air between the tube and tire, while the air supply adaptor houses a valve suitable for engagement to an automotive air supply, the tubing being characterized by a flexible cord within the tube which prevents total constriction of the tube resulting from kinking or pinching.

In a further form of the invention the flexible cord is made from nylon and has a diameter between 10% and 30% that of the internal diameter of the tubing.

BRIEF DESCRIPTION OF THE DRAWINGS

The invention can be better understood when reference is had by way of example to an embodiment of the invention as illustrated in the accompanying diagrams in which.

DESCRIPTION OF THE PREFERRED EMBODIMENTS

Figure 1:
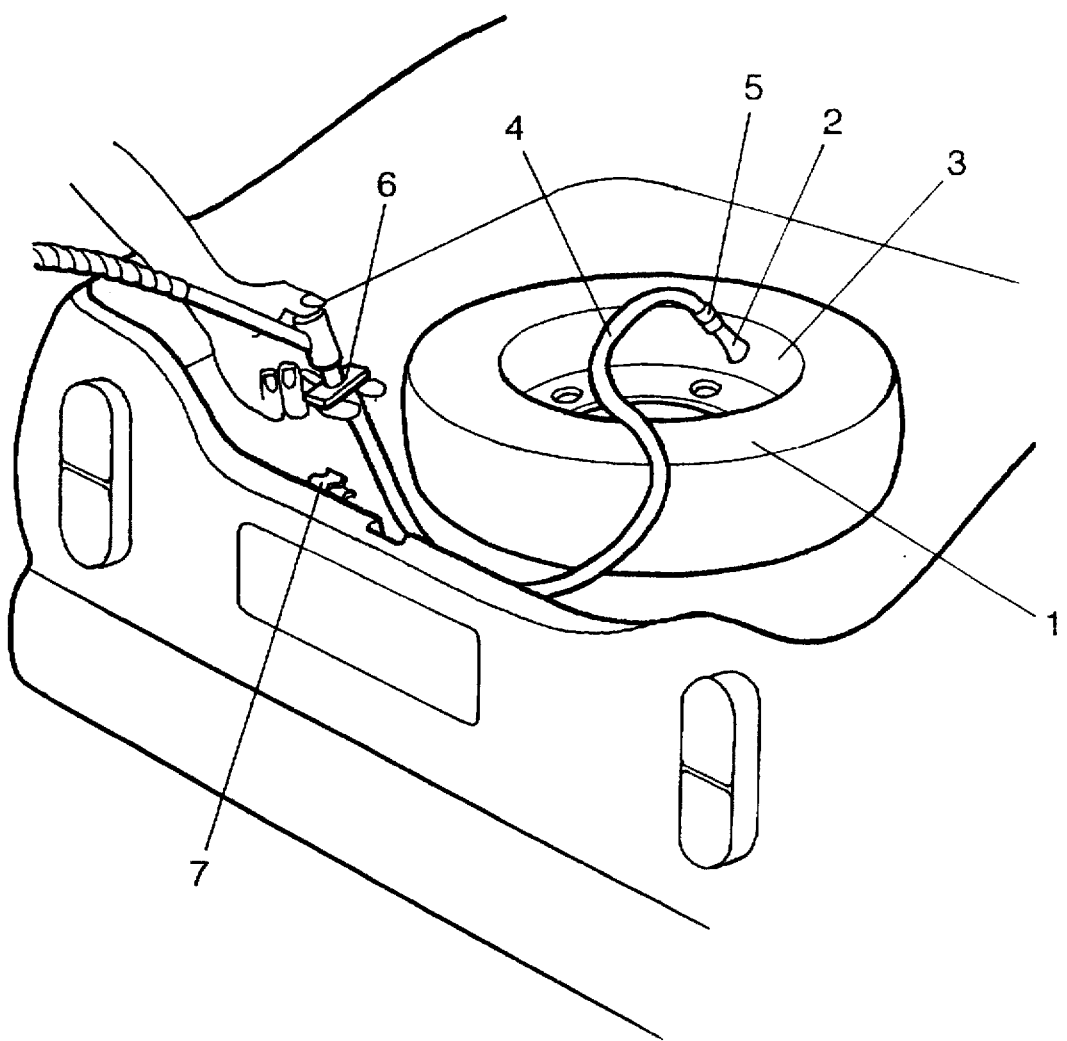
FIG. 1 shows the accessory coupled to a spare tire

Referring to FIG. 1, a spare tire 1 located underneath the floor of a trunk has a valve stem 2 extending from the wheel rim 3. A flexible tube 4 has a tire end 5 which when installed is secured to the valve stem. At the opposite end of the tubing there is an inflation end 6. The tubing is made preferably from PVC plastic and is approximately 1 meter in length allowing it to be fed so that the inflation end is positioned in a readily accessible location, such as just inside the rear wall of the trunk. At this location a retaining clip 7 is adhesively secured, the clip being of a type that is releasable for the purposes of handling the inflation end.

Figure 2:
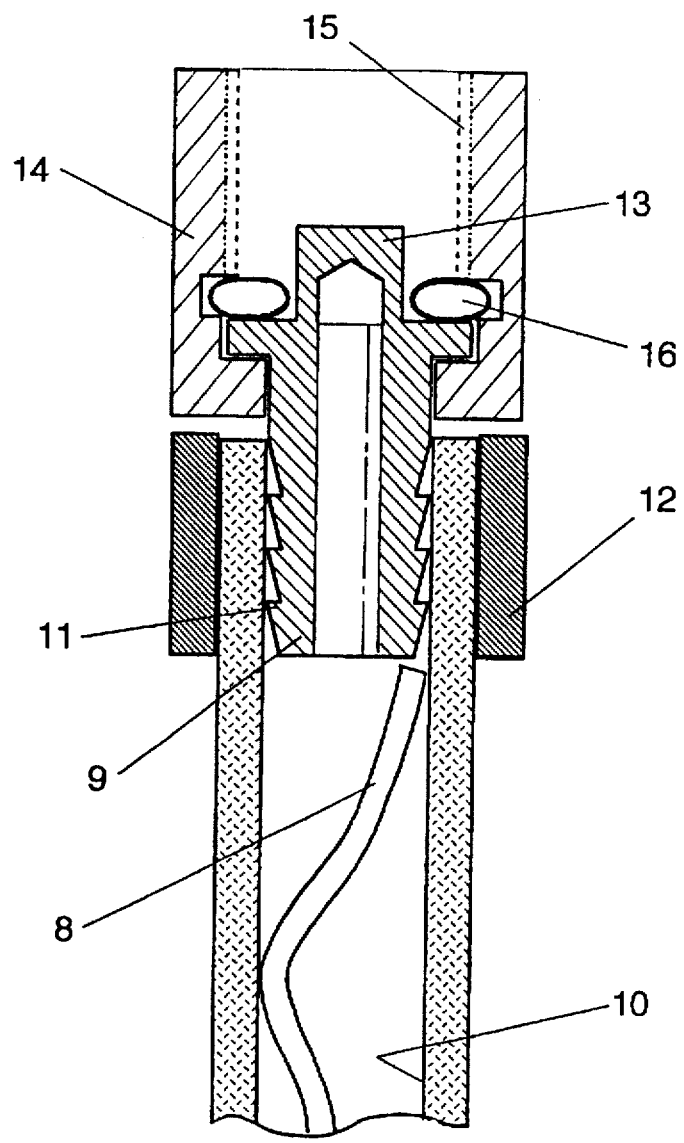
FIG. 2 shows a crossection of the valve end

Preferably the tubing has an external diameter of 7–8 mm and an internal diameter of 4–6 mm. It should have sufficient wall thickness to withstand prolonged internal air pressures of up to 60 psi. Within the tube, along a substantial length of it, a cord is inserted so that it terminates in close proximity to the valve adaptor as shown in FIG. 2. This figure shows a crossection of the valve adaptor in which the cord 8 is plastically kinked so as to not pass through the bore of the nozzle 9. Also the kink serves both to inhibit the longitudinal movement of the cord by interacting against the inner wall of the tube 10 and to accommodate any compression from the abutting nozzle during assembly.

The cord is preferably nylon and of a diameter between 1 and 2 mm, and it can be effectively represented by fishing line. The cord also allows the tube to be bent around sharp corners or to be squashed from a load without total obstruction of air flow which would otherwise arise from total collapse of the tubing walls. The cord separates the inner walls in these instances of a sharp bend (kink) or squeezing caused by 20 luggage or an installation pressure point. This principle of an inner cord can be applied to other situations, such as garden hoses, in which kinking of tubing represents a problem.

The nozzle has ribs 11 having a diameter marginally larger than the internal diameter of the tube. An outer compression sleeve 12 has an internal diameter marginally less than that of the portion of tube enveloping the nozzle, thereby ensuring compression of the tubing onto the outer edges of the ribs and preventing escape of any air within the tube.

The nozzle includes a protrusion 13 that serves to depress the valve core of a tire to which it is engaged, thereby allowing the ingress of air into the tire. The protrusion has one dimension which is less than the internal bore size in order to expose the internal bore which otherwise would be blind.

A thread ring 14 is captured by a flange on the nozzle and by the tubing 5 or sleeve. An internal threaded portion 15 has specifications suitable for mating with a tire valve, while an o-ring or more specifically a quad-ring 16 ensures a seal between the tire valve and nozzle. The rigid components of the assembly are preferably made from brass, though other metals or engineering plastics may be used.

Figure 3:
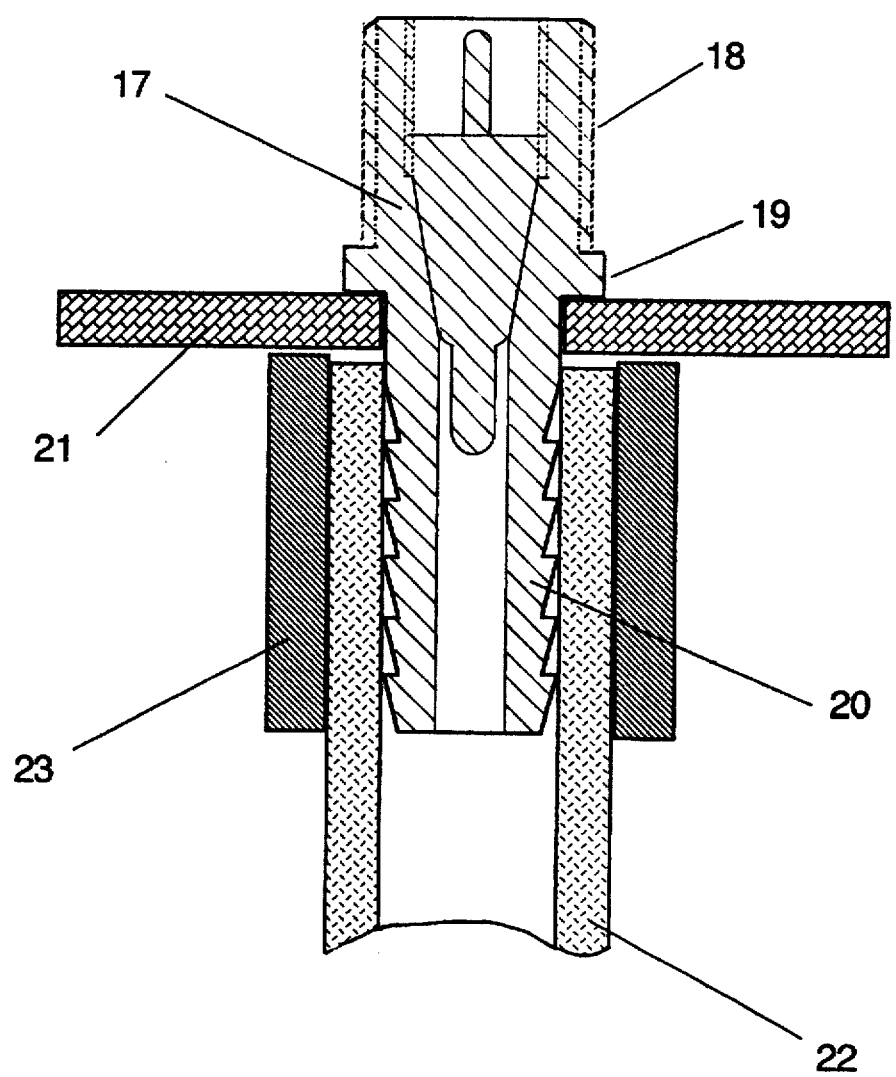
FIG. 3 shows a crossection of the inflation end.

The other end of the Invention accessory features the inflation end which is shown in FIG. 3. It comprises a conventional tire valve body 17 which has a threaded outer portion 18, a flange 19 and a ridged portion 20 which is fashioned in a similar manner to the ribbed portion of the nozzle 9. The valve includes a valve core for directional control of air. This core is a standard item and does not form any part of this invention A finger plate 21 is located adjacent the flange and is held in place by the tubing 22 and compression sleeve 23. The finger plate enables a person to support the valve end comfortably whilst applying force with an air gun during inflation. The finger plate is substantially rectangular 20 with an aspect ratio of 3–4:1. The plate is preferably stamped from aluminum or other metal sheet. The compression sleeve 23 provides a firm body by which the inflation end can be supported in a retaining clip.

The inflation end may be disassembled, the finger plate discarded and then substituted by an auto body panel having in it drilled a suitably sized hole around which the inflation end can be reassembled. Such arrangement allows external access to the valve and suitable locations for it include near the number plate or adjacent the petrol filling port. In an alternative embodiment of the invention particularly suited to installation during assembly of new cars, the finger plate is replaced by an annular retaining clip, so that the end can be push-fitted into a body panel from the tubing side.

A variation of the invention includes an elbow at the tire end made from plastics material. One arm of the elbow holds a thread ring, whilst the other arm is barbed to accept a tube. The inclusion of such component 5 minimizes the possibility of the tube being kinked near the tire valve.

it will be appreciated that the invention provides for an elegant solution to the problem of inflating spare tires stored in vehicle trunks and it will be further appreciated that the essential elements of the foregoing discussions can be applied to the instance where the spare tire is located under the body of the car. Variations of the design outside the described embodiment of the invention are possible whilst still falling within the scope of the invention. The details of the invention item that have not been covered are considered rudimentary in the field of engineering design and do not form part of the invention.

I claim:

1. A spare tire inflation accessory comprising a flexible tube fastened at a first end to a tire valve connector and at a second end to an air-supply adaptor, wherein the tire valve connector is configured to secure by a screwing action to a tire valve so as to depress the valve core allowing free transfer of air between the tube and tire, while the air-supply adaptor houses a valve suitable for engagement to an automotive air supply, the tube being characterized by a flexible plastic cord contained within the tube, in which the cord has a diameter of approximately 1–2 mm.

2. A tire inflation accessory as in claim 1 in which the adaptor and connector each have a barbed nozzle of diameter fractionally larger than the internal diameter of the tube, the nozzles being disposed within each extremity of the tube, and sleeves having an internal diameter similar to the outside diameter of the tube are positioned at the same longitudinal position as the nozzles thereby sandwiching the walls of the tube between the nozzle and the sleeve to provide an airtight seal.

3. A tire inflation accessory as in claim 1 wherein a plate extends from the air-supply adaptor, the plate being in a plane perpendicular to the longitudinal axis of the adaptor and able to support two fingers straddling the adaptor to provide a reactive force when an airgun is coupled to the adaptor.

4. A tire inflation accessory as in claim 2 wherein a plate extends from the air-supply adaptor, the plate being in a plane perpendicular to the longitudinal axis of the adaptor and able to support two fingers straddling the adaptor to provide a reactive force when an airgun is coupled to the adaptor.

5. An inflation accessory as in the claim 1 wherein the flexible cord is located adjacent the tire valve connector and extends at least 30 cms along the length of the flexible tube.

6. An inflation accessory as in the claim 2 wherein the flexible cord is located adjacent the tire valve connector and extends at least 30 cms along the length of the flexible tube.

7. An inflation accessory as in the claim 3 wherein the flexible cord is located adjacent the tire valve connector and extends at least 30 cms along the length of the flexible tube.

8. An inflation accessory as in any claim 1 wherein the flexible tube is made from poly vinyl chloride and is approximately 1 meter in length.

9. An automotive vehicle in which an inflation accessory as in claim 1 is fitted.

* * * * *